United States Patent [19]
Van Orden

[11] 3,783,723
[45] Jan. 8, 1974

[54] METHOD OF CUTTING THIN, BRITTLE MATERIAL

[75] Inventor: William H. Van Orden, Enfield, Conn.

[73] Assignee: United Aircraft Corporation, East Hartford, Conn.

[22] Filed: Aug. 23, 1972

[21] Appl. No.: 282,996

[52] U.S. Cl............................ 83/21, 83/284, 83/55, 83/509
[51] Int. Cl............................................. B26f 1/44
[58] Field of Search .................. 83/21, 13, 284, 37, 83/55, 509

[56] References Cited
UNITED STATES PATENTS

| | | | |
|---|---|---|---|
| 2,055,077 | 9/1936 | Guerin | 83/21 |
| 2,127,820 | 8/1938 | Kindelberger | 83/284 |
| 3,301,110 | 1/1967 | Stegner | 83/284 X |
| 124,669 | 3/1872 | Delkescamp | 83/21 |

*Primary Examiner*—Donald R. Schran
*Attorney*—Stephen E. Revis

[57] ABSTRACT

A method of cutting shaped pieces from thin brittle material, such as composite fiber reinforced tape, comprises positioning the material to be cut on top of the flat surface of a template, wherein an edge of the template defines the periphery of the flat surface and is the cutting edge of the template, and the flat surface has the shape of the piece to be produced; a compressible material is pressed against the brittle material forcing the brittle material against the flat surface and causing overhanging portions of the brittle material to bend below the plane of the flat surface, whereupon it is cut by the edge of the template.

1 Claim, 7 Drawing Figures

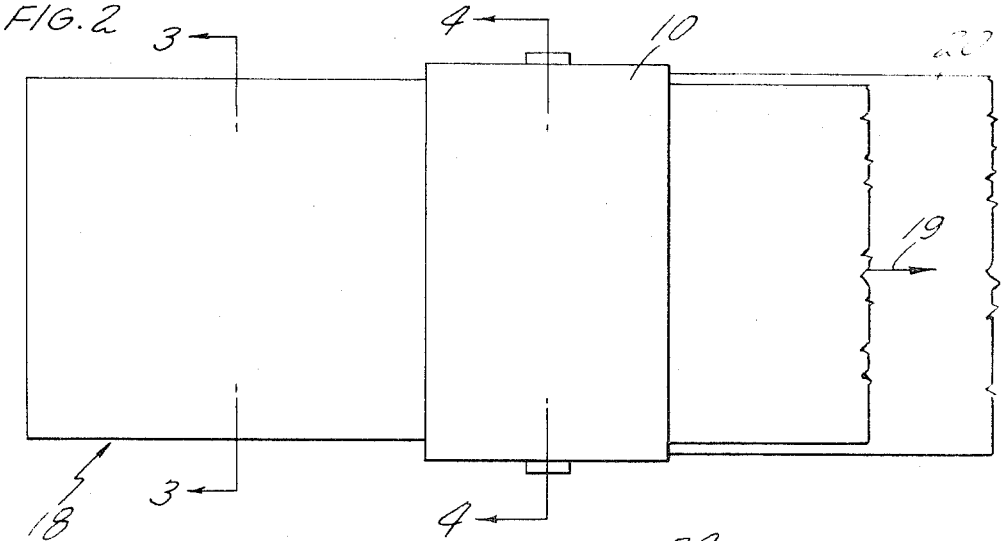
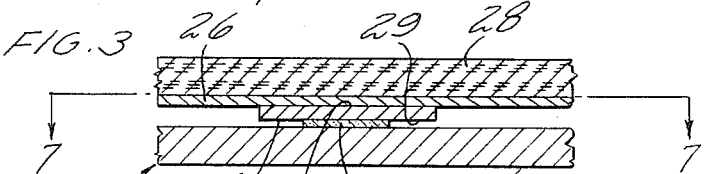
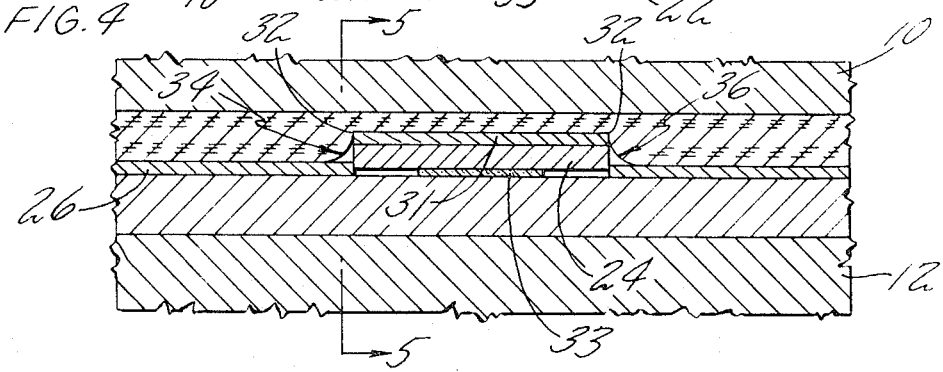
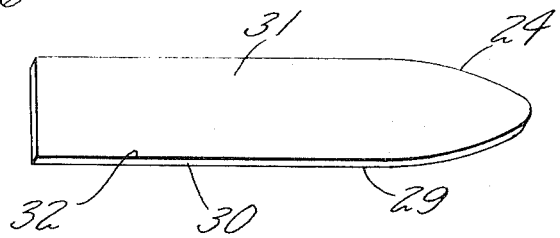

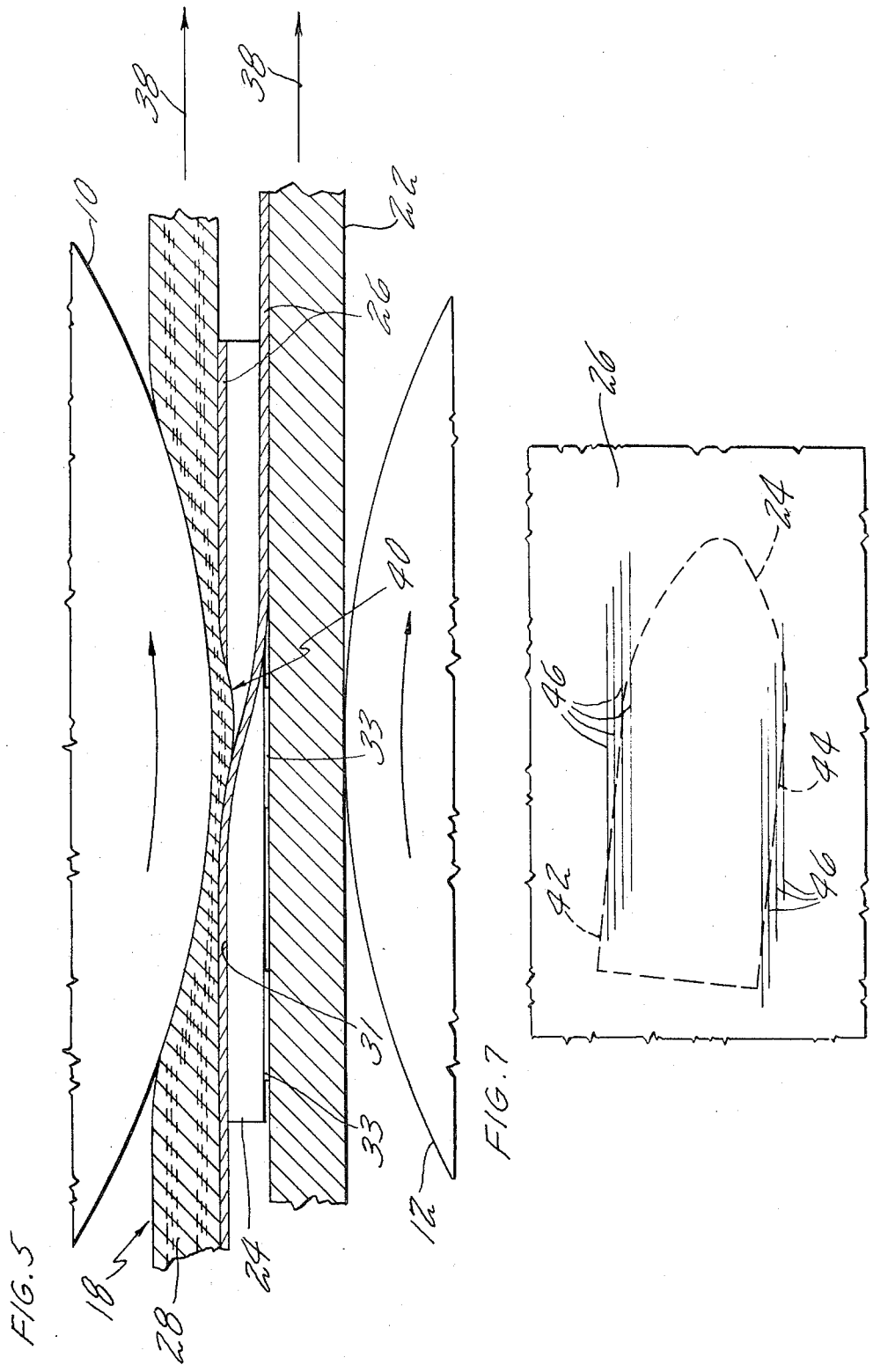

3,783,723

METHOD OF CUTTING THIN, BRITTLE MATERIAL

BACKGROUND OF THE INVENTION

1. Field of the Invention

This invention relates to cutting shaped pieces from thin brittle material.

2. Description of the Prior Art

Several techniques are disclosed in the prior art for cutting thin materials into shaped pieces. One such technique is shown in U.S. Pat. No. 2,757,728 to J. F. De Lisi et al. The De Lisi patent, however, is particularly concerned with cutting foam rubber and other soft and resilient materials. A feature of the De Lisi patent, which is a feature common to many of the other techniques known in the art for cutting shaped pieces from relatively thin material, is the use of a knife edge for accomplishing the cutting. Some brittle materials, however, will not cut cleanly when pressed against such a knife edge; the lack of support for the material on either side of the knife edge can result in a splintering of the brittle material. This is particularly true for composite materials which comprise brittle fibers within a matrix material; fibers on either side of the knife edge may splinter and crack due to the slight amount of bending which occurs prior to the knife edge cutting through the fibers. A clean cut is thus often difficult to achieve.

Scissors may be used to cut these brittle materials, including composite materials, but the use of scissors is not practical for large scale production operations, or even for a small scale test program such as the manufacture of a composite blade wherein as many as one hundred pieces of composite material of varying sizes and shapes may be required for the manufacture of a single blade. Additionally, scissors often cause splintering of composite fibers for the same reasons that a knife edge causes splintering. Furthermore, uniformity is difficult to achieve.

SUMMARY OF THE INVENTION

One object of the present invention is an improved method for cutting shaped pieces from thin brittle materials.

Another object of the present invention is a method for quickly and easily cutting shaped pieces from composite material comprising brittle fibers within a matrix material.

Accordingly, the method comprises covering the flat surface of a template with the material to be cut, the edge of the template forming the periphery of the flat surface and being the cutting edge of the template, the flat surface having the shape of the desired piece, and pressing a compressible material against the brittle material forcing the brittle material against the flat surface, the compressible material including a portion extending outwardly from the periphery, wherein the pressing is done in a manner to cause the outwardly extending portion of the compressible material immediately adjacent the periphery of the flat surface to bend below the plane of the flat surface whereby the brittle material is cut by the edge of the template.

In one embodiment of the present invention the pressing is done with a roller and the compressible material is a sheet of cork which overlies the brittle material. The roller presses against the cork which in turn presses the brittle material against the flat surface of the template. That portion of the cork extending outwardly of the periphery of the flat surface is pressed below the plane of the flat surface adjacent to the periphery. As the roller passes over the surface of the cork, the brittle material is sheared by the edge of the template in a scissors-like fashion. That portion of the brittle material which overlies the flat surface of the template is prevented from bending because it is being held tightly against the flat surface by the cork.

In a preferred embodiment, the template, brittle material, and cork is passed between two parallel vertically spaced rollers which are in pressing and rolling relationship to the cork.

The method of this invention is particularly suited to cutting thin composite materials comprising brittle parallel fibers within a matrix material. These composite materials may be on the order of only several mils in thickness and the fibers may be extremely brittle, thus requiring particular care to prevent fiber breakage. One such composite material comprises boron fibers in an aluminum matrix. What previously had taken several hours to accomplish by means of scissors takes only several minutes using the method of the present invention, while at the same time producing a more cleanly cut piece.

The foregoing and other objects, features and advantages of the present invention will become more apparent in the light of the following detailed description of the preferred embodiment thereof as illustrated in the accompanying drawing.

BRIEF DESCRIPTION OF THE DRAWINGS

FIG. 2 is a partial top view of the apparatus shown in FIG. 1.

FIG. 3 is a partial sectional view taken along the line 3—3 in FIG. 2.

FIG. 4 is a partial sectional view taken along the line 4—4 in FIG. 2.

FIG. 5 is a partial sectional view taken along the line 5—5 in FIG. 4.

FIG. 6 is a perspective view of a template used in the method of this invention.

FIG. 7 is a partial sectional view taken along the line 7—7 in FIG. 3.

DESCRIPTION OF THE PREFERRED EMBODIMENT

Figure 1:
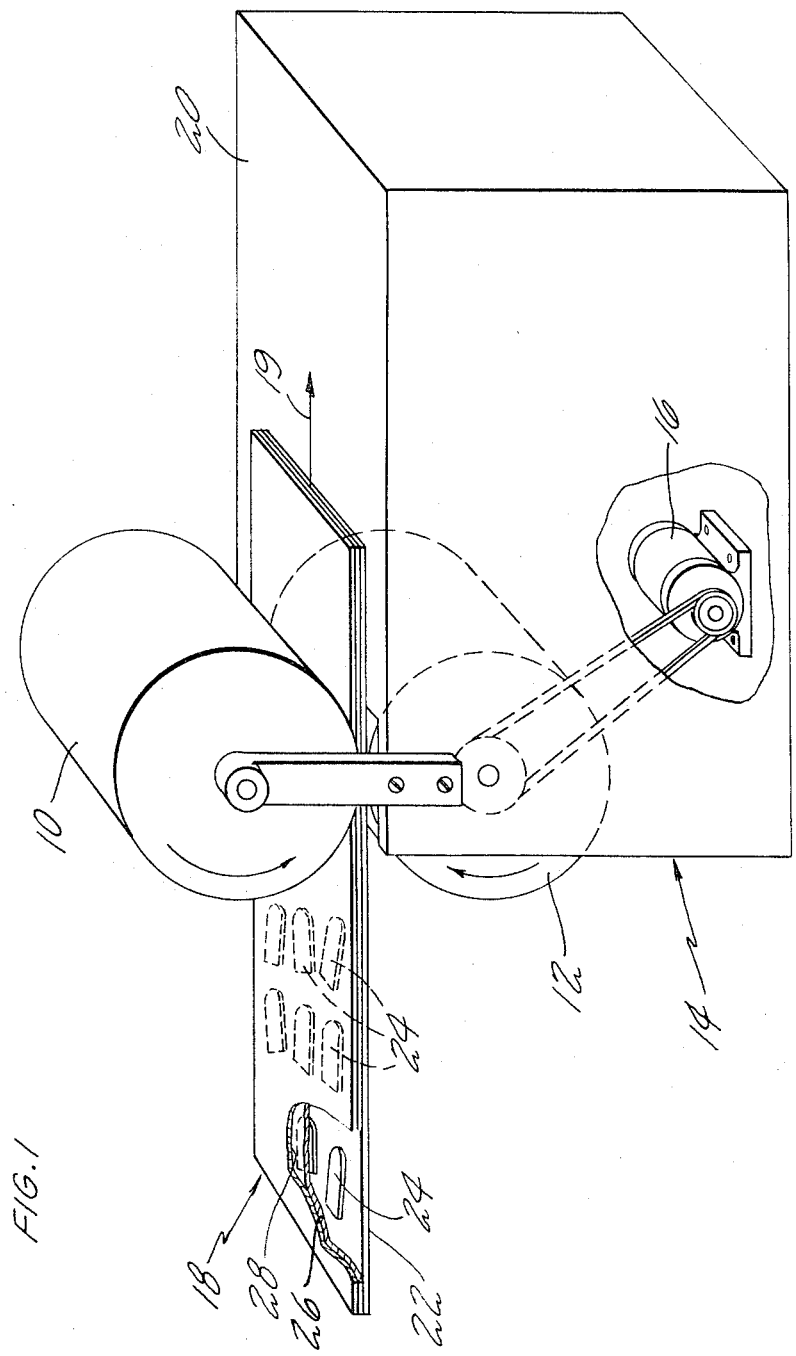
FIG. 1 is a perspective view, partially broken away, of apparatus used in the method of the present invention.

As an example of one embodiment of the method of the present invention, consider the apparatus shown in FIGS. 1 and 2. The apparatus comprises upper and lower vertically spaced parallel rollers 10, 12 respectively, rotatably attached to a housing 14. The housing 14 encloses driving means, such as a motor 16, for driving the lower roller 12. A workpiece 18, which is hereinafter referred to as a sandwich, and which will hereinafter be described in more detail, is shown in the process of passing between the two rollers 10, 12, the rollers being in pressing engagement to the sandwich 18. The arrow 19 indicates the direction of movement of the sandwich. The housing 14 also includes a table top 20 for supporting the sandwich 18 after it passes between the rollers.

Referring now to FIG. 3 (which is a cross-sectional view of the sandwich 18 prior to its passing between the rollers 10, 12) the sandwich 18 in this exemplary embodiment comprises a support plate 22, a plurality of templates 24 (only one of which is shown in FIG. 3), attaching means 33, the material to be cut 26, and a compressible, flexible material 28. The support plate 22 is, in this instance, steel, but it could be made from almost any strong, rigid material. The relative thickness of the sandwich components as shown in FIG. 3 and as shown in FIGS. 4 and 5 referred to hereinafter, are not to scale for the purpose of clarity.

The template 24, best shown in FIG. 6, comprises a base 29, a lateral surface 30 and a flat upper surface 31. The lateral surface 30 meets the upper surface 31 to form an edge 32 which is the cutting edge of the template. The cutting edge 32 defines the periphery of the upper surface 31, the upper surface 31 having the shape of the piece to be cut. One or more of these templates 24 are affixed to the support plate 22 by any suitable attaching means 33 such as by two-way adhesive tape shown in FIG. 3 or cement. The use of two-way adhesive tape allows quick substitution of one template for another. It is contemplated, however, that for a large scale production run the templates 24 may be integral with the support plate 22. In any event, attaching the templates 24 to the support plate 22 simply prevents the templates from moving with respect to the support plate as the sandwich 18 passes between the rollers 10, 12; attaching means may not always be necessary.

The periphery of each flat surface 31 of each template 24 corresponds to the final shape of a desired piece. The material to be cut 26 is positioned onto the surface 31 and must, of course, cover the entire surface if a properly shaped piece is to be cut, although it need not overhang the surface around the entire periphery. For the purposes of the present invention, the material to be cut 26 must be thin and brittle. In this embodiment the brittle material 26 is a composite material, on the order of 6 mils thick, comprising high strength but brittle boron fibers within an aluminum matrix. If the composite material 26 is to be cut into shaped plies for gas turbine engine blades, such as is contemplated in the present example, then the fibers will be continuous and parallel within the matrix material so as to produce plies having high strength in one direction.

Positioned on top of the composite material 26 is the compressible material 28, which is preferably flexible and resilient such that it may be reused. In this exemplary embodiment, the compressible material is a sheet of cork approximately ¼ inch thick, although the thickness is not particularly important. Rubber may also be suitable; and some types of plastic foam may work satisfactorily. For reasons which will hereinafter become clear, the cork 28 must extend outwardly of the periphery of the surface 31 at least along the same portions of the periphery where the composite material 26 extends outwardly therefrom. FIGS. 4 and 5 show one of the templates 24 as it passes between the rollers 10, 12. Several of these templates may, of course, pass between the rollers simultaneously. As the template 24 passes between the rollers 10, 12, the sheet of cork 28 serves two purposes: first, it holds the composite material 26 flush against the surface 31 of the template 24 during the cutting; and second, that portion of the cork 28 extending outwardly of the periphery of the surface 31 is pressed below the plane of the surface 31 (as at 34 and 36) causing the brittle material 26 to be sheared by the edge 32. It should become apparent at this point why the material 26 must be brittle; if it were not brittle, it would simply fold at the edge 32 without being cut in a manner similar to the cork 28. By holding the composite material 26 flush with the surface 31 of the template 24, a clean cut without damage to the finished piece is assured; this is particularly important in the present embodiment wherein the material being cut is a composite material comprising brittle fibers. Only slight bending of the fibers may cause them to break, and thus they must be held flush with the template surface 31 during the cutting. With regard to plies for composite blades, broken fibers within the airfoil are detrimental to the overall strength of the blade. It may be noted at this point that the sharper the cutting edge 32 the cleaner the cut; however, a very sharp edge is not required. Satisfactory cuts of boron-aluminum composite material have been made with templates having a cutting edge with a radius of 0.010 inch.

FIG. 5 best shows the composite material in the process of being cut. In this instance the lower roller 12 is driven by the motor 16 (FIG. 1) and drives the sandwich 18 between the rollers 10, 12 in the direction of the arrows 38. The upper roller 10 compresses the cork 28 below the surface 31 of the template 24 in the area of closest proximity between the rollers 10, 12, as indicated by the arrow 40, and causes the composite material to be sheared by the edge 32 in a scissors-like fashion. That portion of the composite material 26 which has passed between the rollers 10, 12 has already been cut.

Referring now to FIG. 7, when the brittle material being cut comprises parallel fibers in a matrix material, such as the composite material 26, and the cutting edge 32 of the template 24 has straight portions, such as the straight portions 42, 44, then the direction of fiber orientation within the brittle material should not be parallel to said straight portions. The reason for this is that if the fibers and the cutting edge of the template are parallel, the edge may slice between a pair of adjacent fibers and would not be able to cleanly cut the matrix material separating the fibers, thus leaving a rough edge on the cut piece which would have to be trimmed after the cutting operation. In FIG. 7 the fiber orientation of the composite material 26 is represented by the lines 46. Only a slight angle, such as 5°, is required between the fibers and the template edges 42, 44 to eliminate this problem.

There are a number of alternate embodiments contemplated within the scope of the present invention. For example, it is not necessary to pass the sandwich 18 between two stationary rollers; it should be obvious that the sandwich could remain stationary while the rollers traverse the length of the sandwich by means of a horizontally movable carriage within which the rollers would be mounted. It is also possible to utilize a single roller to apply pressure to the compressible material; any flat surface could act as a support plate for the templates as the roller passed over the surface of the compressible material. Actually, the cutting could be achieved simply by applying a vertical pressure over the surface of the compressible material, such as within a press; however, in that instance a very large pressure would be required as compared to the pressure required when using a roller or rollers; the reason for the higher pressure requirement is that with simple pressing there is no scissors-like shearing action as occurs with a roller.

In another embodiment of the present invention, the compressible material 28, rather than being in the form of a sheet, may be in the form of a covering for the upper roller 10; that is, the outer surface of the upper roller may be made of cork.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. A method of cutting shaped plies for composite parts from composite tape, the tape including continuous parallel brittle fibers embedded within a matrix material, including the steps of:

positioning at least one template on a support plate, said template having a flat surface facing away from said support plate, said surface having the shape of a piece to be produced, said template having a cutting edge defining the periphery of said surface, said cutting edge including at least one straight portion;

positioning the composite tape onto said surface such that said straight portions of said cutting edge are at an angle with respect to the axis of the fibers of said tape, said tape covering said entire surface and extending outwardly from said periphery of said surface at least around portions thereof;

positioning a compressible material in the form of a sheet on top of said tape and flat surface, said sheet extending outwardly from said periphery at least around said portions thereof, said support plate, template, tape and sheet forming a sandwich; and passing said sandwich between the surfaces of upper and lower vertically spaced parallel cylindrical rollers, said upper roller being in rolling engagement with said compressible sheet and said lower roller being in rolling engagement with said support plate, wherein said outwardly extending compressible material immediately adjacent said periphery is pressed below the plane of said flat surface, whereby said tape is sheared at the edge of said surface producing a ply.

* * * * *

PO-1050
(5/69)

UNITED STATES PATENT OFFICE
CERTIFICATE OF CORRECTION

Patent No. 3,783,723      Dated January 8, 1973

Inventor(s) William H. VanOrden

It is certified that error appears in the above-identified patent and that said Letters Patent are hereby corrected as shown below:

Column 1, after the title, insert the following paragraph:

--The invention herein described was made in the course of or under a contract with the Department of the Air Force.--

Signed and sealed this 30th day of April 1974.

(SEAL)
Attest:

EDWARD M. FLETCHER, JR.
Attesting Officer

C. MARSHALL DANN
Commissioner of Patents